US012485488B2

(12) United States Patent
Nelson

(10) Patent No.: US 12,485,488 B2
(45) Date of Patent: Dec. 2, 2025

(54) APPARATUSES, SYSTEMS, AND METHODS FOR PROVIDING ENHANCED RECOATER EVENT PREDICTION FOR DMLM ADDITIVE MANUFACTURING

(71) Applicant: General Electric Company, Schenectady, NY (US)

(72) Inventor: Tyler N. Nelson, Skowhegan, ME (US)

(73) Assignee: General Electric Company, Evendale, OH (US)

( * ) Notice: Subject to any disclaimer, the term of this patent is extended or adjusted under 35 U.S.C. 154(b) by 499 days.

(21) Appl. No.: 17/965,034

(22) Filed: Oct. 13, 2022

(65) Prior Publication Data
US 2023/0121090 A1    Apr. 20, 2023

Related U.S. Application Data

(60) Provisional application No. 63/257,724, filed on Oct. 20, 2021.

(51) Int. Cl.
*B22F 10/85* (2021.01)
*B33Y 50/02* (2015.01)
(Continued)

(52) U.S. Cl.
CPC .............. *B22F 10/85* (2021.01); *B33Y 50/02* (2014.12); *B22F 10/25* (2021.01)

(58) Field of Classification Search
CPC .......... B22F 10/85; B22F 10/25; B22F 10/31; B22F 10/80; B22F 10/28; B33Y 50/02;
(Continued)

(56) References Cited

U.S. PATENT DOCUMENTS 5,059,021 A    10/1991   Spence et al.
7,536,271 B2   5/2009    Marsh et al.
(Continued)

FOREIGN PATENT DOCUMENTS

EP    3549746 A1    10/2019
EP    3711881 A1    9/2020
(Continued)

OTHER PUBLICATIONS

Peter Noha et al: "Benchmarking build simulation software for laser powder bed fusion of metals", Additive Manufacturing, vol. 36, Aug. 15, 2020 (Aug. 15, 2020), p. 101531, XP093024990, NL ISSN: 2214-8604, DOI: 10.1016/j.addma.2020.101531.
(Continued)

*Primary Examiner* — Michael J Brown
(74) *Attorney, Agent, or Firm* — Dinsmore & Shohl LLP

(57) ABSTRACT

A method may include receiving data associated with a part to be built by additive manufacturing using a recoater, predicting a distortion amount comprising a distance that the part is expected to distort in a vertical direction at one or more layers while the part is being built based on a simulation of the part being built, determining a likelihood of a recoater event based on the predicted distortion amount, determining a severity factor associated with the predicted distortion amount at each of the one or more layers of the part based on an orientation of the part at each of the one or more layers, and determining an adjusted likelihood of a recoater event at each of the one or more layers based on the predicted distortion amount and the determined severity factor. Apparatuses and systems are also provided for enhanced recoater event prediction for DMLM additive manufacturing.

20 Claims, 10 Drawing Sheets

(51) Int. Cl.
*B22F 10/25* (2021.01)
*B33Y 10/00* (2015.01)
*G06F 30/23* (2020.01)

(58) Field of Classification Search
CPC ..... B33Y 10/00; B33Y 50/00; G06F 2113/10; G06F 2119/18; G06F 30/23; Y02P 10/25
USPC ........................................................ 700/119
See application file for complete search history.

(56) References Cited

U.S. PATENT DOCUMENTS

| | | |
|---|---|---|
| 8,784,721 B2 | 7/2014 | Philippi et al. |
| 9,751,262 B2 | 9/2017 | Graham et al. |
| 10,500,791 B2 | 12/2019 | Amaya et al. |
| 10,509,388 B2 | 12/2019 | Regnault et al. |
| 10,543,673 B2 | 1/2020 | Tran et al. |
| 10,960,607 B2 | 3/2021 | Ostroverkhov et al. |
| 10,974,456 B2 | 4/2021 | Khairallah et al. |
| 10,996,652 B2 | 5/2021 | Chin et al. |
| 11,328,107 B2 | 5/2022 | Yang et al. |
| 2017/0368753 A1 | 12/2017 | Yang et al. |
| 2019/0001658 A1 | 1/2019 | Matthews, Jr. et al. |
| 2020/0139625 A1 | 5/2020 | Allanic |
| 2020/0298498 A1* | 9/2020 | Jayawickrema ...... B29C 64/153 |
| 2020/0376761 A1 | 12/2020 | Sweetland |
| 2020/0391293 A1 | 12/2020 | Sheinman et al. |
| 2021/0187845 A1 | 6/2021 | Colson |
| 2022/0245305 A1 | 8/2022 | Yang et al. |

FOREIGN PATENT DOCUMENTS

| | | |
|---|---|---|
| WO | 2019094472 A1 | 5/2019 |
| WO | 2021170448 A1 | 9/2021 |

OTHER PUBLICATIONS

Extended European Search Report for Application No. 22199751.3 dated Mar. 2, 2023 (8 pages).

Dmitry Pinaev and Sean Mauch, High-performance mesh morphing with adaptive B-splines, Siemens PLM, Nordostpark 3, 90411 Nuremberg (9 pages).

* cited by examiner

APPARATUSES, SYSTEMS, AND METHODS FOR PROVIDING ENHANCED RECOATER EVENT PREDICTION FOR DMLM ADDITIVE MANUFACTURING

CROSS-REFERENCE TO RELATED APPLICATION

This application claims priority to U.S. Provisional Application No. 63/257,724 filed on Oct. 20, 2021, the entire contents of which is hereby incorporated by reference.

FIELD

The present disclosure relates to DMLM additive manufacturing, and more specifically, to enhanced recoater event prediction for DMLM additive manufacturing.

BACKGROUND

Direct metal laser melting (DMLM) is an additive manufacturing process that uses lasers to melt ultra-thin layers of metal powder to build a three-dimensional object or part. Computer-aided design (CAD) software may be used to design a three-dimensional part. An output file generated by the CAD software may then be converted into a plurality of slice files representing different layers of the part. The slice files are then loaded onto a DMLM machine, which can build the part.

During operation, a recoater moves across a build platform and evenly spreads a thin layer of fine metal powder. A laser then melts a cross-section of the part for one layer based on a slice file. The build platform is then lowered and the process is repeated for the next layer of the part.

However, as the part is being built, certain portions of the part may become distorted due to thermal gradients and/or strain. In some cases, a part may become distorted towards a top of the build chamber where the recoater passes. If this happens, the recoater may catch on the part as it moves across the part to add a new layer of powder. This may damage the part and/or prevent the build from continuing or being completed properly. Accordingly, prediction of such distortions may be desirable.

DETAILED DESCRIPTION

Figure 1:
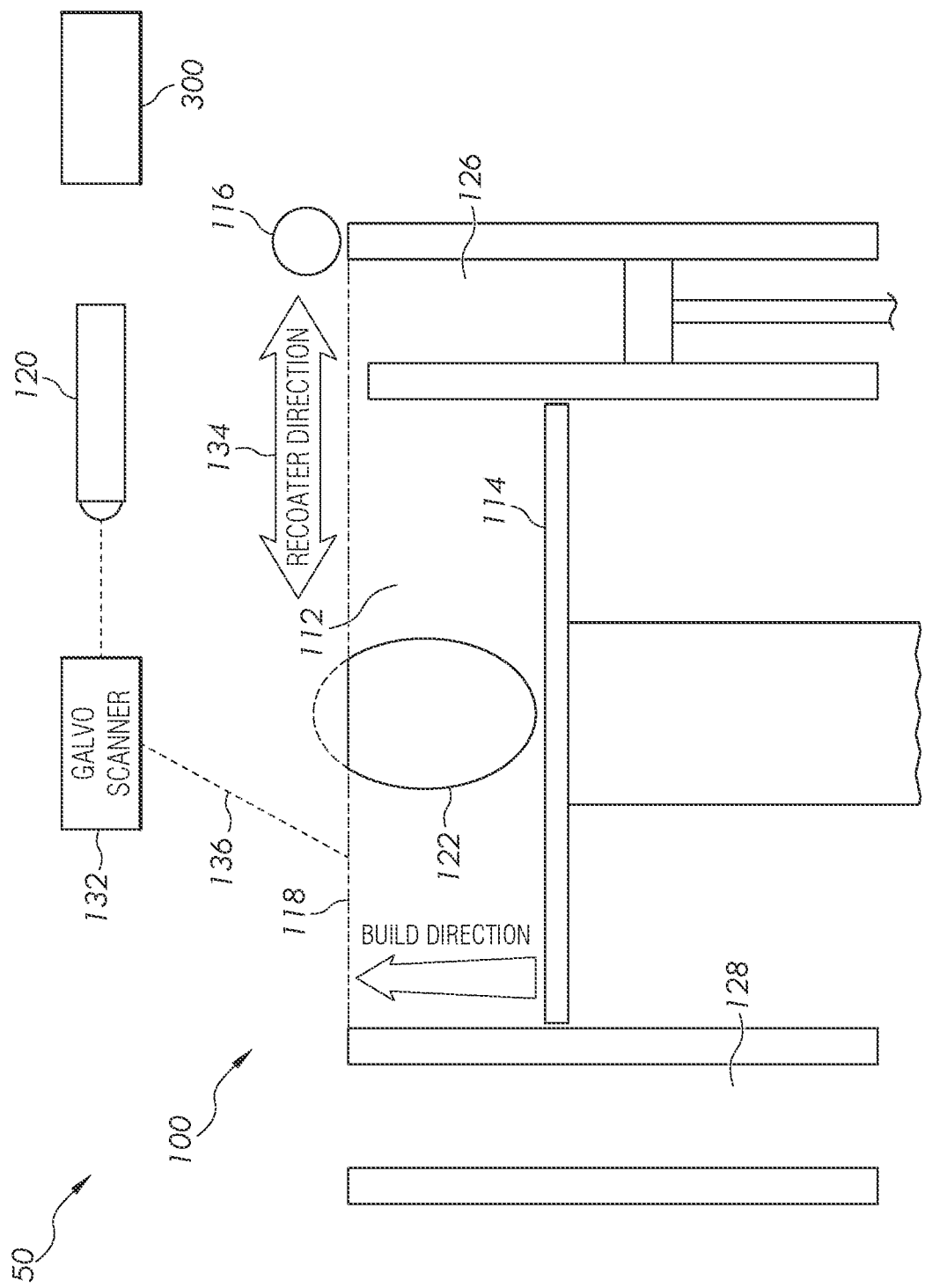
FIG. 1 schematically depicts a system for building a part by additive manufacturing, according to one or more embodiments shown and described herein.

The present disclosure generally relates to enhanced recoater event prediction for DMLM additive manufacturing. FIG. 1 shows a schematic diagram of a system 50 for performing DMLM additive manufacturing. The system 50 of FIG. 1 includes of an apparatus 100 for performing DMLM additive manufacturing and a recoater event prediction apparatus 300. As used herein, the apparatus 100 may be referred to as a DMLM machine. The recoater event prediction apparatus 300 is discussed in further detail below in connection with FIG. 3.

The DMLM machine 100 builds objects, such as, for example, a part 122, in a layer-by-layer manner by sintering or melting a powder material using an energy beam 136 generated by a source such as, for example, a laser 120. The powder to be melted by the energy beam is supplied by a reservoir 126 and is spread evenly over a build plate 114 using a recoater 116 (e.g., a recoater arm) traveling in a direction 134 to maintain the powder at a level 118 and/or remove excess powder material extending above the powder level 118 to waste container 128.

The energy beam 136 sinters or melts a cross sectional layer of the object being built under control of a galvo scanner 132. The build plate 114 is then lowered and another layer of powder is spread over the build plate 114 and the part 122 being built, followed by successive melting/sintering of the powder by the laser 120. The process is repeated until the part 122 is completely built from the melted/sintered powder material.

The laser 120 may be controlled by a computer system including a processor and a memory. The computer system may determine a scan pattern for each layer and may control the laser 120 to irradiate the powder material according to the scan pattern.

After fabrication of the part 122 is complete, various post-processing procedures may be applied to the part 122. Post processing procedures may include removal of excess powder by, for example, blowing or vacuuming. Other post processing procedures may include a stress release process. Additionally, thermal and chemical post processing procedures may be used to finish the part 122.

In the illustrated example, the recoater 116 only moves in one direction while depositing powder onto the build plate 114. In the example of FIG. 1, the recoater 116 moves in direction 134 when depositing powder onto the build plate. After the recoater 116 moves in direction 134 across the length of the build plate 114, the recoater 116 moves back in the opposite direction to return to its starting position to be ready to deposit the next layer of powder. However, the recoater 116 only moves back to its starting position after the build plate 114 is lowered. As such, the recoater 116 is only likely to catch on the part 122 while moving in the direction 134 while depositing powder. However, in other examples, the recoater 116 may deposit powder while moving in both directions across the build plate 114. In still other example, the recoater 116 may move in a different manner (e.g., may rotate or the like).

Embodiments disclosed herein are directed to predicting recoater events in DMLM manufacturing. However, in other examples, the embodiments disclosed herein may be used to predict recoater events in other types of additive manufacturing, such as direct metal laser sintering (DMLS), and the like.

As the part 122 is built one layer at a time, the thermal gradient and/or the strain on the part 122 may cause the part 122 to distort. If the part 122 distorts in the vertical direction, then the recoater 116 may catch on the distorted part while moving across the build plate 114 to deposit a layer of powder, referred to herein as a recoater event. This may lead to the part 122 being damaged or may prevent the build of the part from continuing. Accordingly, it may be desirable to predict where such distortions are likely to occur so that preventative steps can be taken to prevent their occurrence or minimize their impact.

One technique for predicting where such recoater events will occur is to perform a build simulation of the part to predict how likely it is that a recoater event will occur. This prediction may be made using a physics-based, finite element analysis. In particular, the prediction may involve a thermal-mechanical analysis and prediction of the residual stress and distortion on a layer-by-layer basis. In some examples, a prediction may be made for the distortion of each layer of a part. In other examples, a prediction may be made for multiple layers of a part at a time.

The analysis may predict a top layer transient vertical distortion relative to the layer thickness of the build. The predicted amount of distortion may then be compared to a gap between the recoater 116 and the part to determine a likelihood of a recoater event. If the predicted amount of vertical distortion is small compared to this gap, then the likelihood of a recoater event is low. However, if the predicted amount of vertical distortion is large compared to this gap (in particular, if the predicted amount of vertical distortion is greater than the gap), then the likelihood of a recoater event is high.

This technique may be used to make a baseline prediction of the likelihood of a recoater event. Specifically, this technique may predict whether the recoater 116 is expected to contact the part during the build. However, just because the recoater 116 contacts the distortion, it does not necessarily follow that the recoater 116 will catch on the part, causing a recoater event. In particular, the orientation of the part may determine a likelihood that the recoater will catch on the part. As such, embodiments disclosed herein may determine an adjusted likelihood of a recoater event based on the orientation of the part.

Figure 2A:
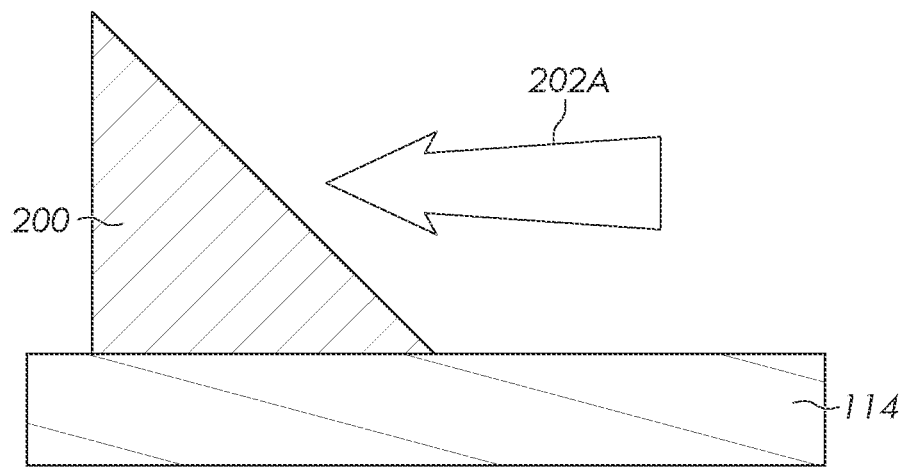
FIG. 2A depicts a cross section of an example part that may be built by the apparatus of FIG. 1, according to one or more embodiments shown and described herein.
Figure 2B:
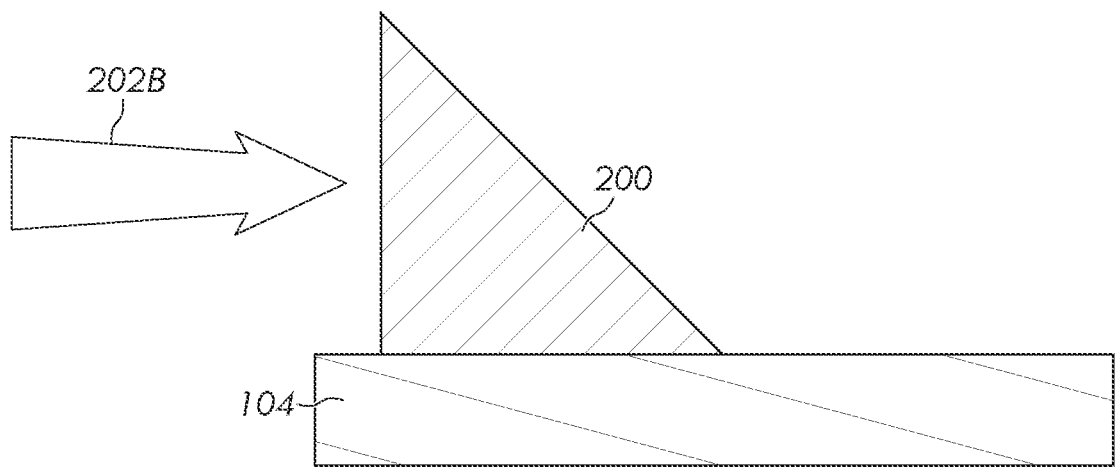
FIG. 2B depicts a cross section of another example part that may be built by the apparatus of FIG. 1, according to one or more embodiments shown and described herein.

FIGS. 2A and 2B show an example of a part 200 being built on the build plate 114. In the example of FIG. 2A, the recoater 116 moves in a direction 202A to deposit powder, while in the example of FIG. 2B, the recoater 116 moves in a direction 202B to deposit powder. Because of the orientation of the part 200 with respect to the recoater 116, in the example of FIG. 2A, the recoater 116 is likely to ride over the part 200 without catching, while in the example of FIG. 2B, the recoater 116 is likely to catch on the part 200. Accordingly, in embodiments disclosed herein, systems and methods are disclosed for taking into account the orientation of a part in order to perform enhanced recoater event prediction for DMLM additive manufacturing.

In embodiments disclosed herein, known techniques may be used to predict an expected amount of vertical distortion of a part during DMLM additive manufacturing. This may be used to determine a baseline likelihood of a recoater event. In addition, in embodiments disclosed herein, the orientation of the part or features within the part may be considered in order to determine an adjusted likelihood of a recoater event, indicating a likelihood that any particular distortion will cause the recoater to catch on the part. As such, distortions that are predicted to cause a recoater event using known techniques may be identified as unlikely to cause a recoater event due to the orientation of the part, using the techniques disclosed herein, thereby eliminating false positives. In addition, multiple orientations (e.g., rotations) of a part may be considered during the build of the part in order to identify the orientation that is least likely to cause a recoater event. As such, a user may be able to avoid recoater events during a build of a part by simply rotating the part to a more desirable orientation, without the need to modify the part design.

Figure 3:
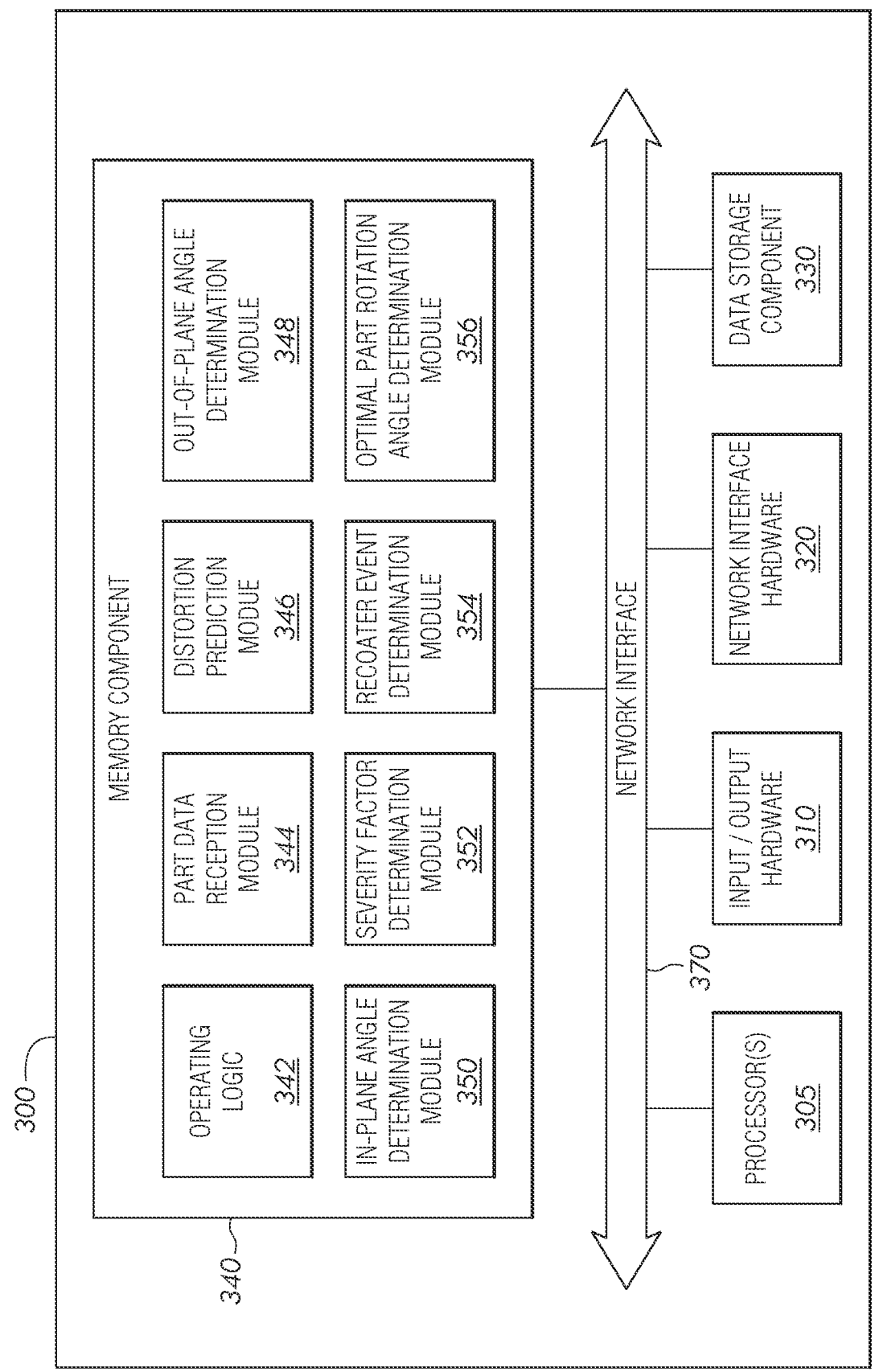
FIG. 3 schematically depicts an event recoater prediction apparatus, according to one or more embodiments shown and described herein.

Now referring to FIG. 3, the components of the recoater event prediction apparatus 300 are schematically depicted. In some examples, the recoater event prediction apparatus 300 may be part of a DMLM machine, such as the DMLM machine 100 of FIG. 1. In other examples, the recoater event prediction apparatus 300 may be a computing device may be a stand-alone computing device or may be part of a computing device separate from the DMLM machine 100. In other examples, the recoater event prediction apparatus 300 may be within a system that includes the DMLM machine 100.

As illustrated in FIG. 3, the recoater event prediction apparatus 300 may include a processor 305, input/output hardware 310, network interface hardware 320, a data storage component 330, and a non-transitory memory component 340. The memory component 340 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 340 may be configured to store operating logic 342, a part data reception module 344, a distortion prediction module 346, an out-of-plane angle determination module 348, an in-plane angle determination module 350, a severity factor determination module 352, a recoater event determination module 354, and an optimal part rotation angle determination module 356 (each of which may be embodied as a computer program, firmware, or hardware, as an example). A network interface 370 is also included in FIG. 3 and may be implemented as a bus or other interface to facilitate communication among the components of the recoater event prediction apparatus 300.

The processor 305 may include any processing component configured to receive and execute instructions (such as from the data storage component 330 and/or the memory component 340). The input/output hardware 310 may include a monitor, keyboard, mouse, printer, camera, microphone, speaker, touch-screen, and/or other device for receiving input and outputting information. The network interface hardware 320 may include any wired or wireless networking hardware, such as a modem, LAN port, wireless fidelity (Wi-Fi) card, WiMax card, mobile communications hardware, and/or other hardware for communicating with other networks and/or devices, such as the DMLM machine 100 of FIG. 1.

Referring still to FIG. 3, the data storage component 330 may store data received by the part data reception module 344. The data storage component 330 may also store other data utilized by the recoater event prediction apparatus 300, as described herein.

Included in the memory component 340 are the operating logic 342, the part data reception module 344, the distortion prediction module 346, the out-of-plane angle determination module 348, the in-plane angle determination module 350, the severity factor determination module 352, the recoater event determination module 354, and the optimal part rotation angle determination module 356. The operating logic 342 may include an operating system and/or other software for managing components of the recoater event prediction apparatus 300.

The part data reception module 344 may receive data associated with a part to be built by the DMLM machine 100. The data received by the part data reception module 344 may indicate the shape of the part to be built by the DMLM machine 100. In the illustrated example, the part data reception module 344 may receive data produced by CAD software. However, in other examples, the part data reception module 344 may receive part data from other types of software programs. The part data received by the part data reception module 344 may be used to predict distortions during the build of the part, and predict recoater events, based on the shape of the part, as disclosed in further detail below.

The distortion prediction module 346 may predict an amount of vertical distortion of the part that is expected to occur during the build by the DMLM machine 100 based on the data associated with the part received by the part data reception module 344. In particular, the distortion prediction module 346 may predict top layer transient vertical distortions of the part at a plurality of layers of the part. In some examples, the distortion prediction module 346 may predict an amount of vertical distortion expected at each layer of the part during build. In other examples, the distortion prediction module 346 may predict an amount of vertical distortion expected for a plurality of layers of the part during build. For example, the distortion prediction module 346 may predict a vertical distortion expected for every ten layers, in order to reduce the amounting of computing resources needed to perform the calculations associated with the prediction.

The distortion prediction module 346 may predict distortions of the part by simulating the build of the part using transient, thermal-mechanical analysis to predict the behavior of the part at each layer. The distortion prediction module 346 may simulate the build of the part based on the data received by the part data reception module 344 and known performance characteristics of the DMLM machine 100. In particular, the distortion prediction module 346 may predict an amount of vertical distortion expected to occur at each point of each layer of the part while the part is being built by the DMLM machine 100.

After predicting an amount of vertical distortion expected during build, the distortion prediction module 346 may determine a baseline likelihood of a recoater event based on the predicted amount of vertical distortion and the gap between the recoater 116 and the part. The greater the predicted amount of vertical distortion with respect to the gap, the higher the likelihood of a recoater event is determined to be. In examples in which an amount of vertical distortion is predicted for a combination of multiple layers, the predicted amount of vertical distortion may be normalized based on the number of layers considered.

Figure 4B:
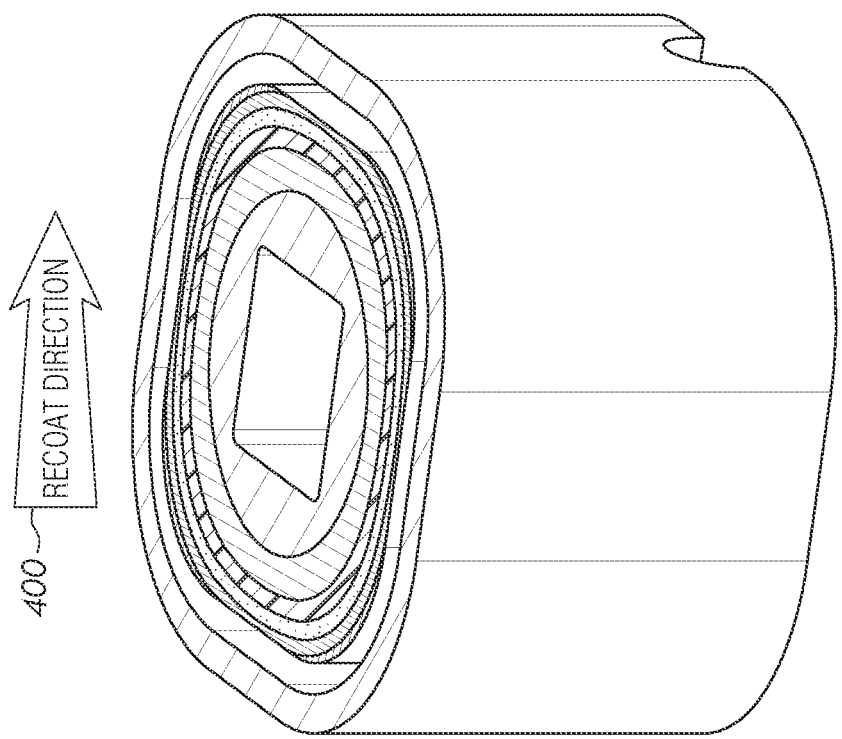
FIG. 4B depicts a plan view of the part of FIG. 4A and an indication of the baseline likelihood of a recoater event, according to one or more embodiments shown and described herein.
Figure 4A:
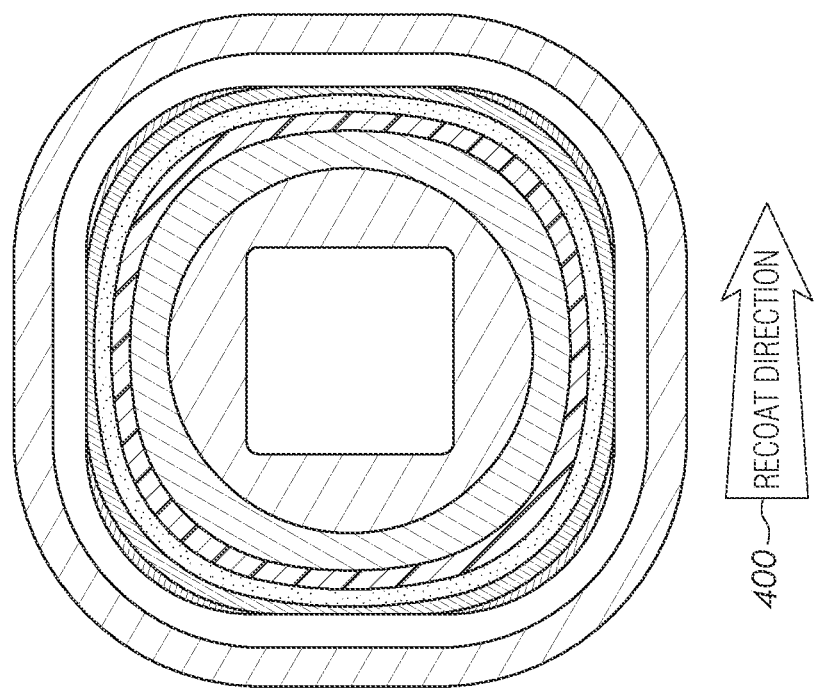
FIG. 4A depicts a cross section of a part that may be built by the apparatus of FIG. 1 and an indication of a baseline likelihood of recoater event, according to one or more embodiments shown and described herein.

FIGS. 4A and 4B indicate a cross-sectional view and a plan view, respectively, of a heat map indicating baseline predictions of the likelihood of a recoater event for one layer of a sample part. In the example of FIGS. 4A and 4B, the recoater 116 travels in a recoat direction 400 and the heavier shaded regions have a higher likelihood of a recoater event than the lighter shaded regions.

The predicted baseline likelihood of a recoater event may indicate a likelihood of the recoater 116 contacting the part during build. However, as explained above, even if the recoater 116 contacts the part, it does not necessarily mean that the recoater 116 will catch on the part. As explained above, depending on the orientation of the part with respect to the recoater 116 and the severity of the distortion, the recoater 116 may either catch on the distortion, as in the example of FIG. 2B, or glide over the distortion without catching, as in the example of FIG. 2A. As such, the additional modules of the recoater event prediction apparatus 300 may determine an adjusted likelihood of a recoater event, based on the orientation of the part, as disclosed below.

Referring again to FIG. 3, the out-of-plane angle determination module 348 may determine an out-of-plane angle between a part being built on the build plate 114 and the recoater 116. As discussed above, the likelihood of a recoater event may depend on the orientation of the part with respect to the recoater 116 during build. In particular, if the part is facing the recoater 116, the recoater 116 is much more likely to catch on the part than if the part is facing away from the recoater 116.

In embodiments, the orientation of the part with respect to the recoater 116 may include two components, including an out-of-plane angle and an in-plane angle. The out-of-plane angle may be determined by the out-of-plane angle determination module 348, as disclosed herein. The in-plane angle may be determined by the in-plane angle determination module 350, as disclosed in further detail below.

Figure 5A:
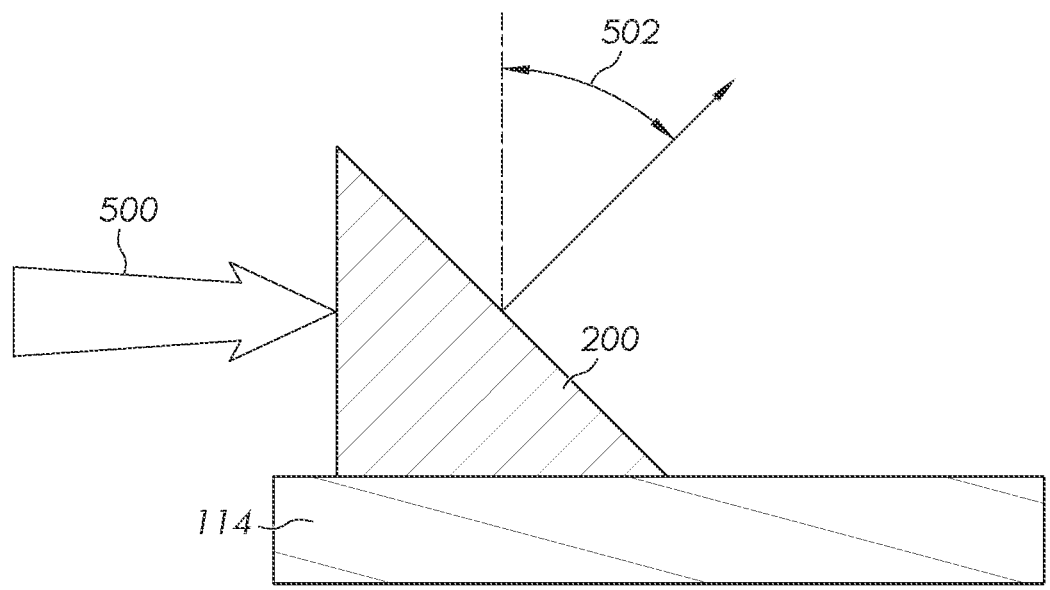
FIG. 5A depicts an out-of-plane angle of a part that may be built by the apparatus of FIG. 1, according to one or more embodiments shown and described herein.

FIG. 5A depicts a cross section of a portion of the part 200 being built on top of the build plate 114. In particular, FIG. 5A depicts a cross section of the part 200 taken perpendicular to the plane of the build plate 114. In the example of FIG. 5A, the recoater 116 moves in a direction 500 when depositing powder onto the build plate 114. FIG. 5A illustrates an out-of-plane angle 502 including an angle between the face of the part 200 and the recoater 116 out of the plane of the build plate 114. The out-of-plane angle 502 may range between about 0° and about 180°, including, but not limited to, about 0°, about 10°, about 20°, about 30°, about 40°, about 45°, about 50°, about 60°, about 70°, about 80°, about 90°, about 100°, about 110°, about 120°, about 130°, about 135°, about 140°, about 150°, about 160°, about 170°, about 180°, or any range or value between any two of these values (including endpoints). The greater the out-of-plane angle 502 is, the more likely a recoater event is to occur, as explained in further detail below.

Referring back to FIG. 3, the out-of-plane angle determination module 348 may determine the out-of-plane angle 502 for each layer of the part 200 based on the data received by the part data reception module 344 indicating the shape of the part 200. In addition, the out-of-plane angle determination module 348 may determine the out-of-plane angle 502 at a plurality of points on each layer of the part 200.

Figure 5B:
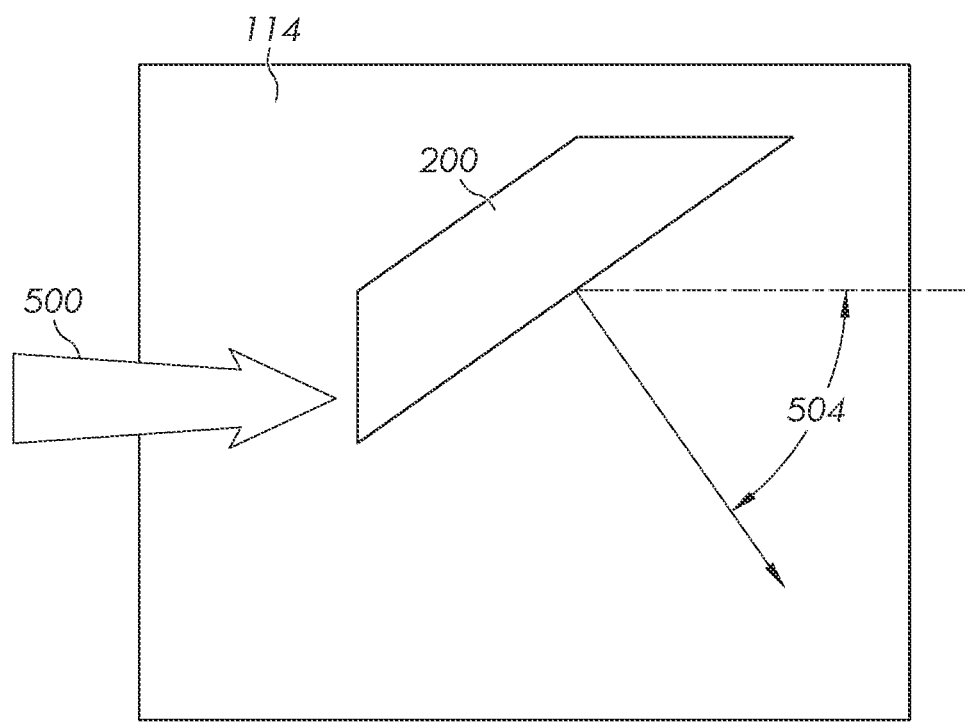
FIG. 5B depicts an in-plane angle of a part that may be built by the apparatus of FIG. 1, according to one or more embodiments shown and described herein.

The in-plane angle determination module 350 may determine an in-plane angle between a part being built on the build plate 114 and the recoater 116. FIG. 5B depicts a different cross section of a portion of the part 200 being built on top of the build plate 114. In particular, FIG. 5B depicts a cross section of the part 200 taken through the plane of the build plate 114. FIG. 5B illustrates an in-plane angle 504 comprising an angle between the face of the part 200 and the recoater 116 in the plane of the build plate 114. Similar to the out-of-plane angle 502, the in-plane angle 504 may range between about 0° and about 180°, including, but not limited to, about 0°, about 10°, about 20°, about 30°, about 40°, about 45°, about 50°, about 60°, about 70°, about 80°, about 90°, about 100°, about 110°, about 120°, about 130°, about 135°, about 140°, about 150°, about 160°, about 170°, about 180°, or any range or value between any two of these values (including endpoints). The greater the in-plane angle, the more likely a recoater event is to occur, as explained in further detail below.

The in-plane angle determination module 350 may determine the in-plane angle 504 for each layer of the part 200 based on the data received by the part data reception module 344 indicating the shape of the part 200. In addition, the in-plane angle determination module 350 may determine the in-plane angle 504 at a plurality of points on each layer of the part 200.

Referring back to FIG. 3, the severity factor determination module 352 may determine a severity factor associated with distortions to the part during build based on the out-of-plane angle and the in-plane angle determined by the out-of-plane angle determination module 348 and the in-plane angle determination module 350, respectively, as disclosed herein. As discussed above, the distortion prediction module 346 may predict an amount of distortion of a part at different layers. The amount of predicted distortion may determine an estimated likelihood that the recoater 116 will contact the part. However, as explained above, depending on the orientation of the part, the contact between the recoater 116 and the part may not be severe enough to cause a recoater event. The severity factor determination module 352 may quantify the severity of the contact between the recoater 116 and the part, as disclosed herein.

In the illustrated example, the severity factor determination module 352 may determine a severity factor between 0 and 1, indicating how severe contact between the recoater 116 and the part is expected to be, based on the orientation of the part. However, in some examples, the severity factor may be greater than 1. The severity factor may indicate how likely such contact is to cause a recoater event. The severity factor determined by the severity factor determination module 352 may be multiplied by the baseline likelihood to determine an adjusted likelihood of a recoater event, as discussed in further detail below in connection with the recoater event determination module 354.

In embodiments, the severity factor determination module 352 may normalize the out-of-plane angle determined by the out-of-plane angle determination module 348 and the in-plane angle determined by the in-plane angle determination module 350 and determine an out-of-plane severity factor and an in-plane severity factor. In particular, the severity factor determination module 352 may determine an out-of-plane severity factor and an in-plane severity factor based on an out-of-plane sensitivity schedule and an in-plane sensitivity schedule, respectively.

Figure 6:
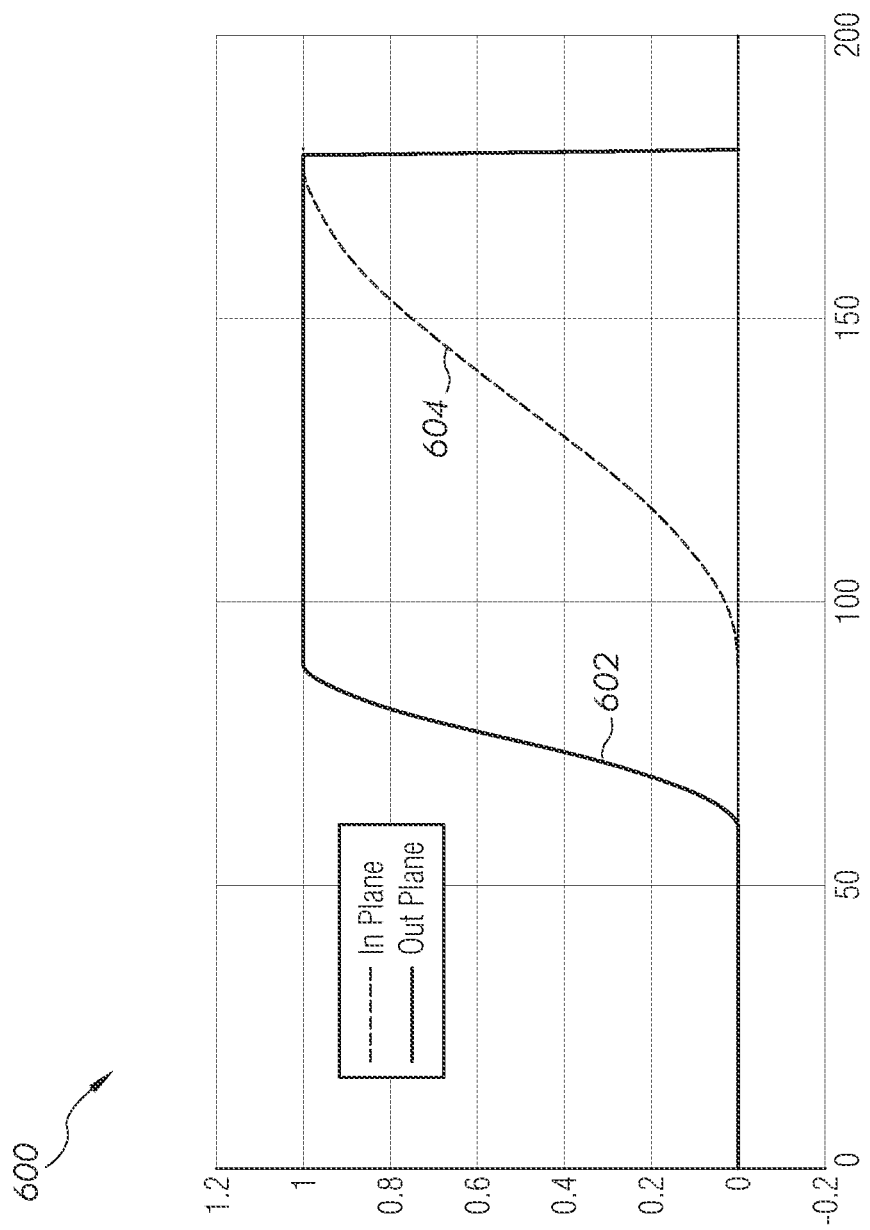
FIG. 6 depicts an example in-plane and out-of-plane sensitivity schedule, according to one or more embodiments shown and described herein.

FIG. 6 depicts a graph 600 showing an example out-of-plane sensitivity schedule 602 and an example in-plane sensitivity schedule 604. In the graph 600 of FIG. 6, the x-axis represents an angle (an in-plane angle or an out-of-plane angle) and the y-axis represents a severity factor (an in-plane severity factor or an out-of-plane severity factor). In the illustrated example, the out-of-plane and in-plane sensitivity schedules 602 and 604 were determined experimentally. However, in other examples, other out-of-plane an in-plane sensitivity schedules may be used.

The out-of-plane sensitivity schedule 602 assigns an out-of-plane severity factor between 0 and 1 for each out-of-plane angle between 0° and 180°. Likewise, the in-plane sensitivity schedule 604 assigns an in-plane severity factor between 0 and 1 for each in-plane angle between 0° and 180°. As can be seen in FIG. 6, the out-of-plane severity factor is 0 for angles below about 60° and increases sharply to a value of 1 for angles greater than about 90°. As can also be seen in FIG. 6, the in-plane severity factor is 0 for angles below about 95° and gradually increases to a value of 1 for an angle of 180°.

Accordingly, the severity factor determination module 352 may use the out-of-plane sensitivity schedule 602 and the in-plane sensitivity schedule 604 to determine an out-of-plane severity factor and an in-plane severity factor based on the out-of-plane angle and the in-plane angle determined by the out-of-plane angle determination module 348 and the in-plane angle determination module 350, respectively.

After determining the out-of-plane severity factor and the in-plane severity factor, the severity factor determination module 352 may combine the two values to determine an overall severity factor. In the illustrated example, the severity factor determination module 352 determines a severity factor by multiplying the out-of-plane severity factor by the in-plane severity factor. However, in other examples, the severity factor determination module 352 may combine the out-of-plane severity factor and the in-plane severity factor in other ways to determine the overall severity factor.

The severity factor determination module 352 may determine the severity factor for a plurality of points on each layer of the part based on the orientation of the part at each layer. Accordingly, the recoater event prediction apparatus 300 may identify particular layers and positions of the part where a recoater event is likely to occur.

Referring back to FIG. 3, the recoater event determination module 354 may determine an adjusted likelihood of a recoater event based on the baseline likelihood of a recoater event determined by the distortion prediction module 346 and the severity factor determined by the severity factor determination module 352. In the illustrated example, the recoater event determination module 354 multiplies the determined severity factor by the baseline likelihood of a recoater event to determine the adjusted likelihood of a recoater event. However, in other examples, the recoater event determination module 354 may combine the baseline likelihood and the severity factor in other ways to determine the adjusted likelihood of a recoater event.

Figure 7B:
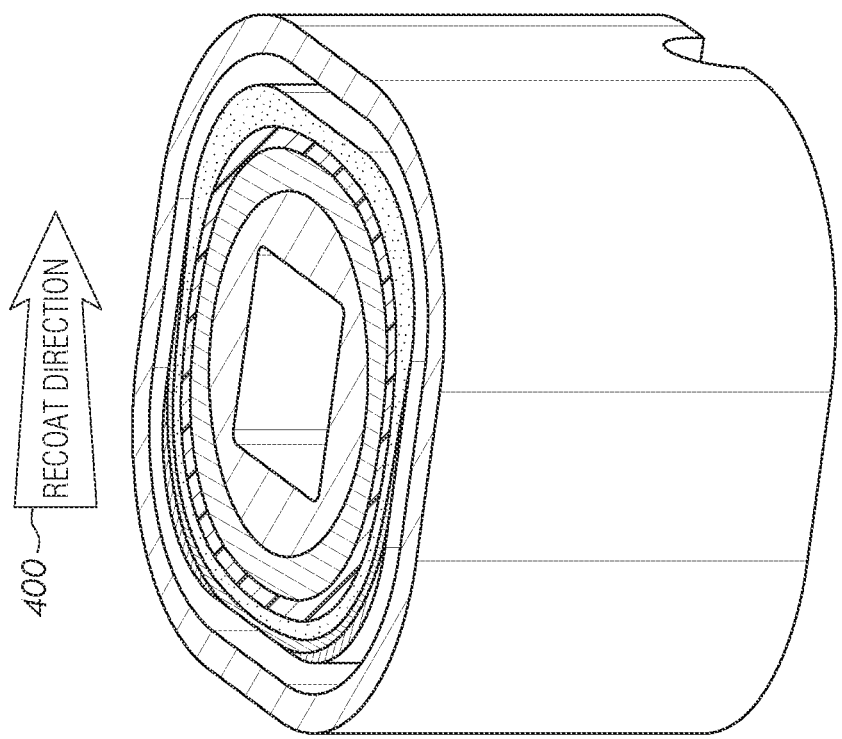
FIG. 7B depicts a plan view of the part of FIG. 4A and an indication of the adjusted likelihood of a recoater event, according to one or more embodiments shown and described herein.
Figure 7A:
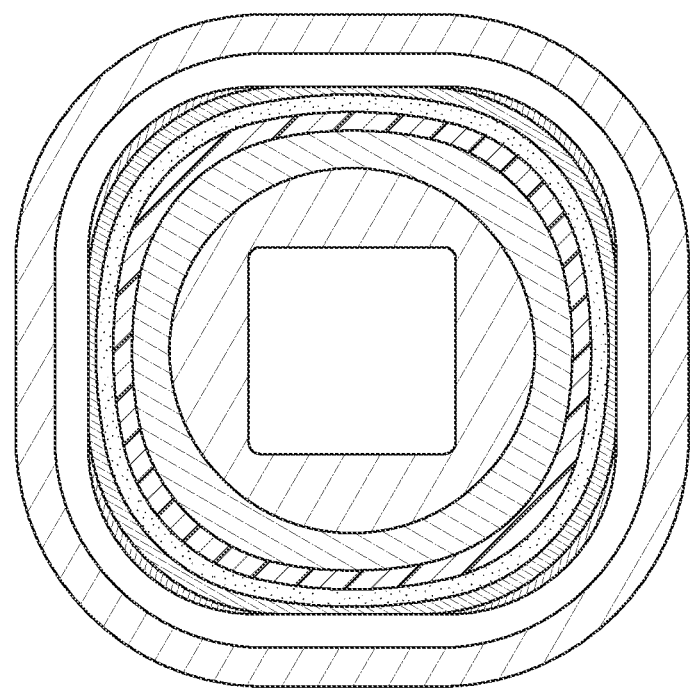
FIG. 7A depicts a cross section of the part of FIG. 4A and an indication of an adjusted likelihood of a recoater event, according to one or more embodiments shown and described herein.

The adjusted likelihood of a recoater event determined by the recoater event determination module 354 may be more accurate than the baseline likelihood of a recoater event determined by the distortion prediction module 346. FIGS. 7A and 7B indicate a cross-sectional view and an isometric view, respectively, of a heat map indicating adjusted predictions of the likelihood of a recoater event for one layer of a sample part. The sample part in FIGS. 7A and 7B is the same as the sample part in FIGS. 4A and 4B. In the example of FIGS. 4A, 4B, 7A, and 7B, the part being built is symmetrical. As such, the adjusted likelihood of a recoater event on the left side of the part (in the orientation of the figures) is the same as the baseline likelihood of a recoater event. However, the adjusted likelihood of a recoater event on the right side of the part is less than the baseline likelihood of a recoater event. Accordingly, the adjusted likelihood shown in FIGS. 7A and 7B is a more accurate indication of the likelihood of a recoater event than the baseline likelihood shown in FIGS. 4A and 4B.

Figure 8:
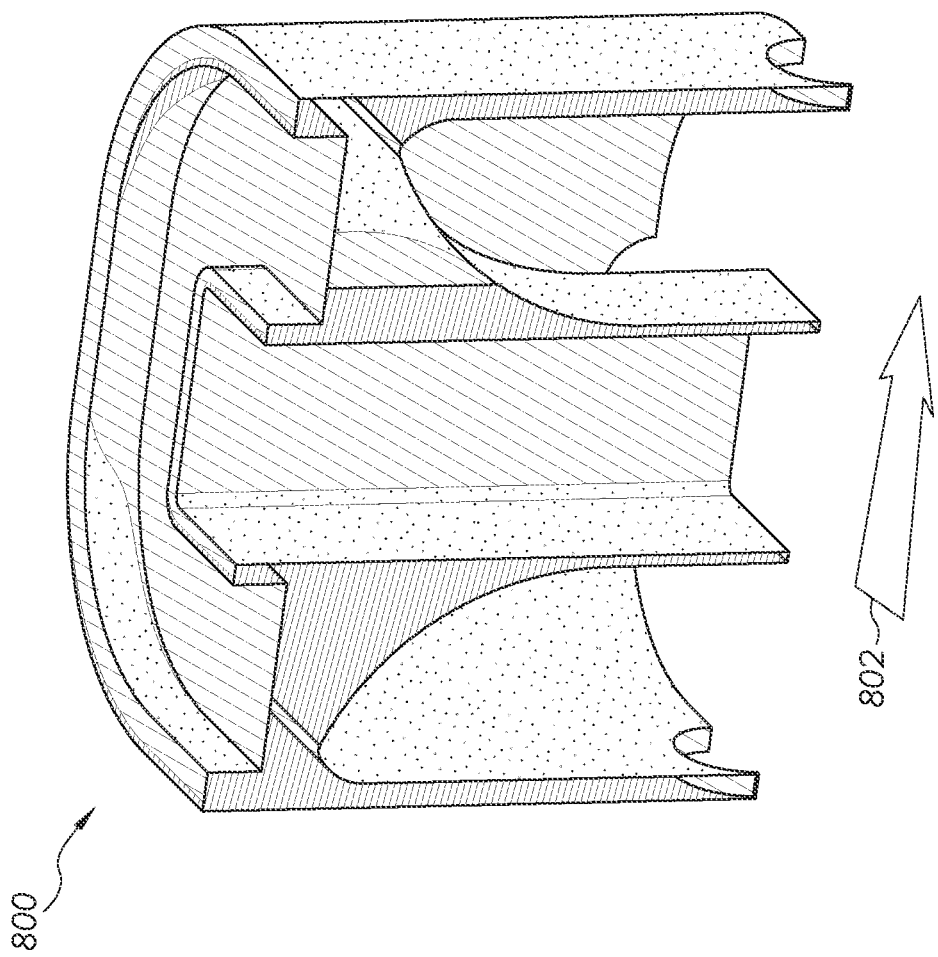
FIG. 8 depicts an image of a part that may be built by the apparatus of FIG. 1 and an indication of the adjusted likelihood of a recoater event, according to one or more embodiments shown and described herein.

In embodiments, the recoater event determination module 354 may produce an image similar to FIG. 7A or 7B indicating an adjusted likelihood of a recoater event for a plurality of points for a given layer of a part being built by the DMLM machine 100. However, in other examples, the recoater event determination module 354 may also produce other visualizations indicating the adjusted likelihood of a recoater event. For example, FIG. 8 indicates a 3-D visualization of a part 800 where the different shadings indicate different likelihoods of a recoater event for a recoater direction of 802.

If the recoater event determination module 354 determines that one or more layers of a part have a high likelihood of a recoater event, a user may take a number of steps to address this issue. For example, the user may redesign the part to reduce the likelihood of such recoater events. However, this may be difficult and time-consuming and may reduce the functionality of the part. Thus, the recoater event prediction apparatus 300 may allow the user to address this issue without redesigning or modifying the part, as disclosed herein.

As discussed above, the recoater event determination module 354 may determine an adjusted likelihood of a recoater event for each layer of a part while being built by the DMLM machine 100 based on the orientation of the part with respect to the recoater 116. However, when a part is being built by the DMLM machine 100, the part may be rotated by any angle around the plane of the build plate 114 and still produce the same part, as long as the rotated part fits within the build volume of the DMLM machine 100. Thus, it may be possible to build the same part without the danger of a recoater event by simply rotating the part using the CAD or other software that produces the part data that is provided to the part data reception module 344. The optimal part rotation angle determination module 356 may determine the optimal angle to rotate a part to minimize the likelihood of a recoater event, as discussed below. In some examples, the optimal part rotation angle determination module 356 may determine an optimal angle to minimize the likelihood of a single recoater event. In other examples, the optimal part rotation angle determination module 356 may determine an optimal angle to minimize the likelihood of a recoater event across an entire build of a part, which may contain multiple potential recoater events.

Referring back to FIG. 3, the optimal part rotation angle determination module 356 may determine an adjusted likelihood of a recoater event for a plurality of angles of rotation of the part. Specifically, after the part data reception module 344 receives data associated with a part to be built, the recoater event determination module 354 may determine an adjusted likelihood of a recoater event for a plurality of layers of the part. The determined adjusted likelihood of a recoater event may be stored in the data storage component 330. The optimal part rotation angle determination module 356 may then adjust the data received by the part data reception module 344 to rotate the part with respect to the recoater 116 by a predetermined amount (e.g., by 1°). The part may be rotated by any amount from 0° to 360°, which effectively changes the direction of the recoater 116 with respect to the part.

After the optimal part rotation angle determination module 356 rotates the part by the predetermined amount, the recoater event determination module 354 may determine the adjusted likelihood of a recoater event for the rotated part. This adjusted likelihood of a recoater event may also be stored in the data storage component 330. The optimal part rotation angle determination module 356 may again adjust the data received by the part data reception module 344 by the predetermined amount and the recoater event determination module 354 may determine the likelihood of a recoater event for the newly rotated part.

This process may be repeated until the optimal part rotation angle determination module 356 has rotated the part by a plurality of angles sweeping from about 0° to about 360°, including, but not limited to, about 0°, about 10°, about 20°, about 30°, about 40°, about 45°, about 50°, about 60°, about 70°, about 80°, about 90°, about 100°, about 110°, about 120°, about 130°, about 135°, about 140°, about 150°, about 160°, about 170°, about 180°, about 190°, about 200°, about 210°, about 220°, about 225°, about 230°, about 240°, about 250°, about 260°, about 270°, about 280°, about 290°, about 300°, about 310°, about 315°, about 320°, about 330°, about 340°, about 350°, about 360°, or any range or value between any two of these values (including endpoints). The optimal part rotation angle determination module 356 may then output an image indicating the adjusted likelihood of a recoater event for a plurality of angles of rotation of the part between 0° and 360°, including, but not limited to, about 0°, about 10°, about 20°, about 30°, about 40°, about 45°, about 50°, about 60°, about 70°, about 80°, about 90°, about 100°, about 110°, about 120°, about 130°, about 135°, about 140°, about 150°, about 160°, about 170°, about 180°, about 190°, about 200°, about 210°, about 220°, about 225°, about 230°, about 240°, about 250°, about 260°, about 270°, about 280°, about 290°, about 300°, about 310°, about 315°, about 320°, about 330°, about 340°, about 350°, about 360°, or any range or value between any two of these values (including endpoints). A user may determine an optimal angle of rotation of the part based on this image.

Figure 9:
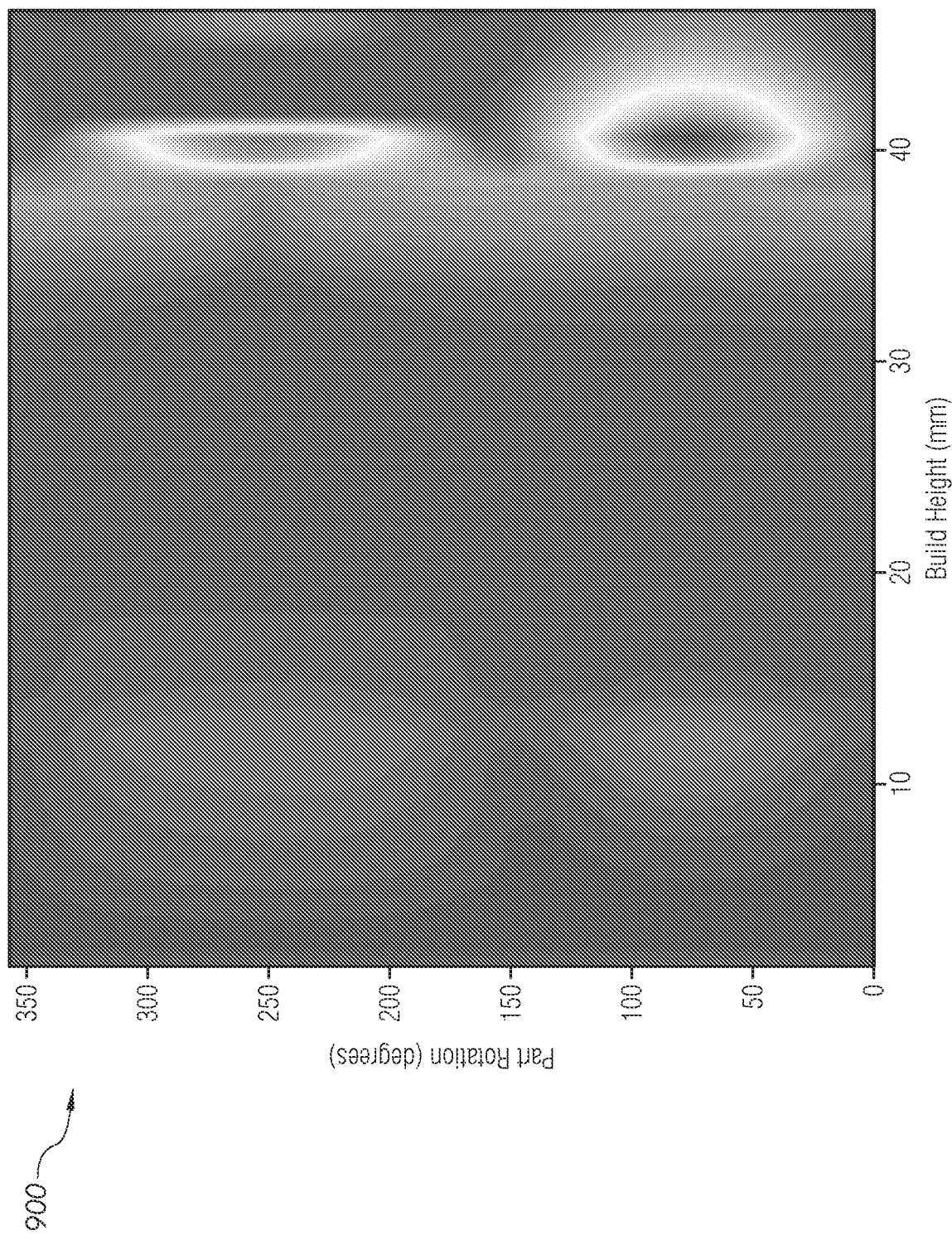
FIG. 9 depicts a graph indicating an adjusted likelihood of a recoater event for a plurality of angles of rotation of a part, according to one or more embodiments shown and described herein.

FIG. 9 shows a graph 900 that may be produced by the optimal part rotation angle determination module 356. In the graph 900 of FIG. 9, the x-axis represents the build height of a part and the y-axis represents the rotation of the part. In particular, the x-axis represents different layers of the part during build and the y-axis represents different angles, from 0° to 360°, that the part may be rotated. The level of shading on the graph 900 represents the adjusted likelihood of a recoater event at each layer of the part for each possible angle of rotation of the part.

Based on the output of the optimal part rotation angle determination module 356, a user may determine the optimal angle to rotate the part to avoid recoater events. In the example of FIG. 9, a rotation angle of about 150° does not have a high likelihood of a recoater event for any of the layers of the part, whereas many other angles of rotation do have a high likelihood of a recoater event at a build layer of around 40 mm. Thus, a user may modify the design of the part to be rotated by 150° to avoid a high likelihood of recoater events without modifying the part design at all. In some examples, the optimal part rotation angle determination module 356 may automatically determine the optimal angle of rotation of the part based on the adjusted likelihood of a recoater event determined by the recoater event determination module 354 for each angle of rotation of the part.

Figure 10:
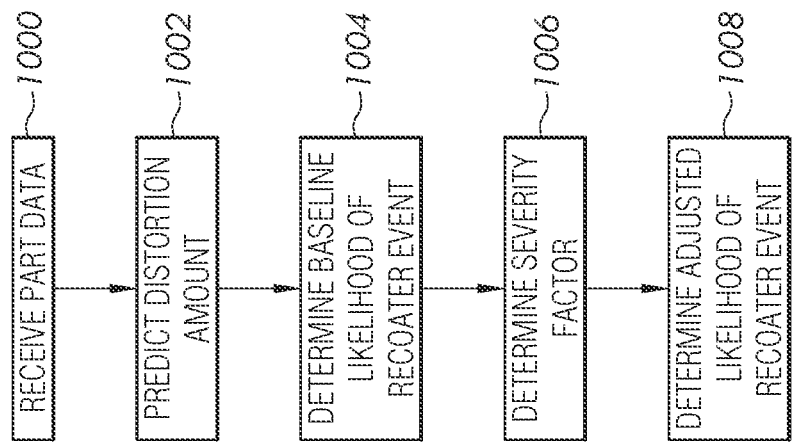
FIG. 10 depicts a flow diagram of an illustrative method for performing recoater event prediction, according to one or more embodiments shown and described herein.

Referring now to FIG. 10, a flow chart is shown of an example method of operating the recoater event prediction apparatus 300 of FIG. 3. At step 1000, the part data reception module 344 receives data associated with a part to be built by the DMLM machine 100. The part data may comprise data about the structure and shape of the part to be built.

At step 1002, the distortion prediction module 346 predicts an amount of vertical distortion expected to the part during build by the DMLM machine 100. The distortion prediction module 346 may predict an amount of vertical distortion expected to occur at a plurality of layers of the part and at a plurality of points of each layer.

At step 1004, the distortion prediction module 346 determines a baseline likelihood of a recoater event based on the predicted amount of vertical distortion. The distortion prediction module 346 may determine a baseline likelihood of a recoater event at a plurality of layers of the part and at a plurality of points of each layer.

At step 1006, the severity factor determination module 352 determines a severity factor for a plurality of layers of the part and at a plurality of points of each layer, based on the orientation of the part. The severity factor determination module 352 may determine an out-of-plane severity factor based on an out-of-plane angle determined by the out-of-plane angle determination module 348 and an out-of-plane sensitivity schedule. The severity factor determination module 352 may also determine an in-plane severity factor based on an in-plane angle determined by the in-plane angle determination module 350 and an in-plane sensitivity schedule. The severity factor determination module 352 may determine the severity factor by multiplying the out-of-plane sensitivity factor and the in-plane sensitivity factor together.

At step 1008, the recoater event determination module 354 determines an adjusted likelihood of a recoater event based on the baseline likelihood of a recoater event determined by the distortion prediction module 346 and the severity factor determined by the severity factor determination module 352. In particular, the recoater event determination module 354 may determine the adjusted likelihood of a recoater event by multiplying the baseline likelihood of a recoater event by the severity factor. The recoater event determination module 354 may determine an adjusted likelihood of a recoater event at a plurality of layers of the part and at a plurality of points of each layer. The recoater event determination module 354 may then output an image indicating the determined adjusted likelihood of a recoater event.

Figure 11:
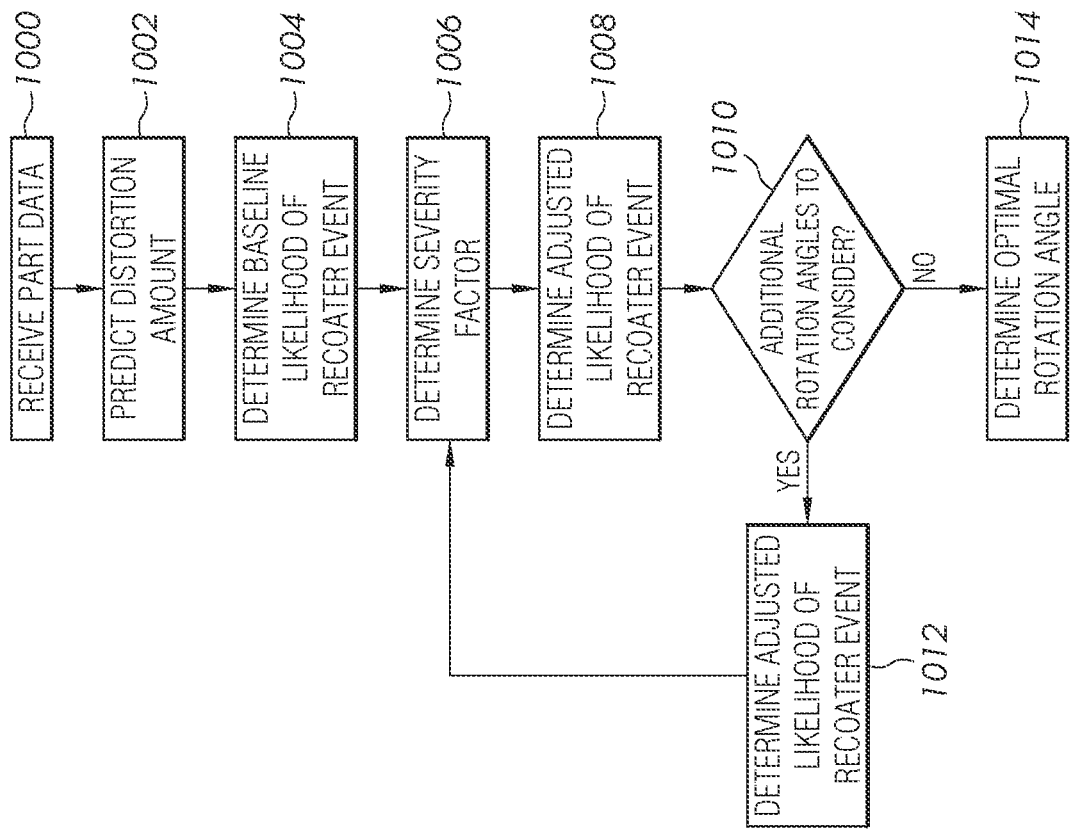
FIG. 11 depicts a flow diagram of another illustrative method for performing recoater event prediction, according to one or more embodiments shown and described herein.

Referring now to FIG. 11, a flow chart is shown of another example method of operating the recoater event prediction apparatus 300 of FIG. 3. Steps 1000-1008 of FIG. 11 are substantially similar to steps 1000-1008 of FIG. 10.

At step 1010, the optimal part rotation angle determination module 356 determines whether additional angles of rotation of the part should be considered. As discussed above, the optimal part rotation angle determination module 356 may cause the recoater event prediction apparatus 300 to determine an adjusted likelihood of a recoater event at a plurality of angles of rotation of the part. Thus at step 1010, the optimal part rotation angle determination module 356 determines whether an adjusted likelihood of a recoater event has been determined for all angles of rotation of the part to be considered.

If the optimal part rotation angle determination module 356 determines that additional angles of rotation of the part should be considered ("YES" at step 1010), then at step 1012, the optimal part rotation angle adjusts the part data received by the part data reception module 344 to rotate the part by a predetermined amount. Control then returns to step 1006 and steps 1006-1008 are repeated to determine an adjusted likelihood of a recoater event for the rotated part. As discussed above, the amount of predicted distortion and the baseline likelihood of a recoater event is the same regardless of the orientation of the part. As such, steps 1002 and 1004 are not repeated for different angles of rotation. However, the severity factor and the adjusted likelihood of a recoater event may change based on the orientation of the part. As such, steps 1006 and 1008 of FIG. 11 are repeated for each angle of rotation of the part.

If the optimal part rotation angle determination module 356 determines that there are no additional angles of rotation to be considered ("NO" at step 1010), then at step 1014, the optimal part rotation angle determination module 356 determines the optimal rotation angle of the part that has the smallest adjusted likelihood of a recoater event. The optimal part rotation angle determination module 356 may also output an image indicating the adjusted likelihood of a recoater event for a plurality of layers of the part for a plurality of angles of rotation of the part.

It should now be understood that the devices, systems, and methods described herein provide enhanced recoater event prediction for DMLM additive manufacturing. In embodiments disclosed herein, data associated with a part to be built by additive manufacturing may be received and distortions expected to occur to the part during the additive manufacturing build may be determined. A baseline likelihood of a recoater event may be determined based on the predicted amount of distortion.

An adjusted likelihood of a recoater event may then be determined based on the orientation of the part. For each layer of the part, an out-of-plane angle and an in-plane angle may be determined for the orientation of the part with respect to the recoater. An out-of-plane severity factor and an in-plane severity factor may be determined based on the out-of-plane angle, the in-plane angle, and an out-of-plane and in-plane sensitivity schedule. The out-of-plane severity factor and the in-plane severity factor may be multiplied together to determine an overall severity factor. The severity factor may then be multiplied by the baseline likelihood of a recoater event to determine the adjusted likelihood of a recoater event. The adjusted likelihood of a recoater event may provide a more accurate determination of the likelihood of a recoater event than the baseline likelihood.

An adjusted likelihood of a recoater event may also be determined for a plurality of angles of rotation of the part. An optimal angle of the rotation of the part may then be determined.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A method comprising receiving data associated with a part to be built by additive manufacturing using a recoater; predicting a distortion amount comprising a distance that the part is expected to distort in a vertical direction at one or more layers while the part is being built based on a simulation of the part being built; determining a likelihood of a recoater event based on the predicted distortion amount; determining a severity factor associated with the predicted distortion amount at each of the one or more layers of the part based on an orientation of the part at each of the one or more layers; and determining an adjusted likelihood of a recoater event at each of the one or more layers of the part based on the predicted distortion amount and the determined severity factor.

The method of any preceding clause, further comprising predicting the distortion amount at a plurality of points at each of the one or more layers of the part; determining the likelihood of a recoater event at each of the plurality of points at each of the one or more layers of the part; determining the severity factor associated with each of the plurality of points at each of the one or more layers of the part; and determining the adjusted likelihood of a recoater event at each of the plurality of points at each of the one or more layers of the part based on the predicted distortion amount at each of the plurality of points and the determined severity factor at each of the plurality of points.

The method of any preceding clause, further comprising generating an image indicating the adjusted likelihood of a recoater event at each of the plurality of points at each layer of the part.

The method of any preceding clause, further comprising, for each of the one or more layers of the part: determining an in-plane angle between the recoater and the part; determining an out-of-plane angle between the recoater and the part; and determining the severity factor based on the determined in-plane angle and the determined out-of-plane angle.

The method of any preceding clause, further comprising determining an in-plane severity factor based on the determined in-plane angle and an in-plane sensitivity schedule; determining an out-of-plane severity factor based on the determined out-of-plane angle and an out-of-plane sensitivity schedule; and determining the severity factor based on the determined in-plane severity factor and the determined out-of-plane severity factor.

The method of any preceding clause, wherein the in-plane sensitivity schedule associates each in-plane angle between 0 and 180 degrees with an in-plane severity factor between 0 and 1; and the out-of-plane sensitivity schedule associates each out-of-plane angle between 0 and 180 degrees with an out-of-plane severity factor between 0 and 1.

The method of any preceding clause, further comprising determining the severity factor by multiplying the determined in-plane severity factor by the determined out-of-plane severity factor.

The method of any preceding clause, further comprising determining a severity factor associated with the predicted distortion amount at each of the one or more layers of the part for a plurality of angles of rotation of the part based on the orientation of the part at each of the one or more layers for each of the plurality of angles of rotation; and determining the adjusted likelihood of a recoater event at each of the one or more layers of the part based on the predicted distortion amount and the determined severity factor for each of the plurality of angles of rotation.

The method of any preceding clause, further comprising generating an image indicate the adjusted likelihood of a recoater event at each of the one or more layers of the part for each of the plurality of angles of rotation.

The method of any preceding clause, further comprising determining an optimum angle of rotation from among the plurality of angles of rotation having a lowest adjusted likelihood of a recoater event at each of the one or more layers.

An apparatus comprising one or more processors; one or more memory modules; and machine-readable instructions stored in the one or more memory modules that, when executed by the one or more processors, cause the apparatus to receive data associated with a part to be built by additive manufacturing using a recoater; predict a distortion amount comprising a distance that the part is expected to distort in a vertical direction at one or more layers while the part is being built based on a simulation of the part being built; determine a likelihood of a recoater event based on the predicted distortion amount; determine a severity factor associated with the predicted distortion amount at each of the one or more layers of the part based on an orientation of the part at each of the one or more layers; and determine an adjusted likelihood of a recoater event at each of the one or more layers of the part based on the predicted distortion amount and the determined severity factor.

The apparatus of any preceding clause, wherein the instructions further cause the apparatus to predict the distortion amount at a plurality of points at each of the one or more layers of the part; determine the likelihood of a recoater event at each of the one or more layers of the part; determine the severity factor associated with each of the plurality of points at each of the one or more layers of the part; and determine the adjusted likelihood of a recoater event at each of the plurality of points at each of the one or more layers of the part based on the predicted distortion amount at each of the plurality of points and the determined severity factor at each of the plurality of points.

The apparatus of any preceding clause, wherein the instructions further cause the apparatus to generate an image indicating the adjusted likelihood of a recoater event at each of the plurality of points at each layer of the part.

The apparatus of any preceding clause, wherein the instructions further cause the apparatus to determine an in-plane angle between the recoater and the part; determine an out-of-plane angle between the recoater and the part; and determine the severity factor based on the determined in-plane angle and the determined out-of-plane angle.

The apparatus of any preceding clause, wherein the instructions further cause the apparatus to determine an in-plane severity factor based on the determined in-plane angle and an in-plane sensitivity schedule; determine an out-of-plane severity factor based on the determined out-of-plane angle and an out-of-plane sensitivity schedule; and determine the severity factor based on the determined in-plane severity factor and the determined out-of-plane severity factor.

The apparatus of any preceding clause, wherein the in-plane sensitivity schedule associates each in-plane angle between 0 and 180 degrees with an in-plane severity factor between 0 and 1; and the out-of-plane sensitivity schedule associates each out-of-plane angle between 0 and 180 degrees with an out-of-plane severity factor between 0 and 1.

The apparatus of any preceding clause, wherein the instructions further cause the apparatus to determine the severity factor by multiplying the determined in-plane severity factor by the determined out-of-plane severity factor.

The apparatus of any preceding clause, wherein the instructions further cause the apparatus to determine a severity factor associated with the predicted distortion amount at each of the one or more layers of the part for a plurality of angles of rotation of the part based on the orientation of the part at each of the one or more layers for each of the plurality of angles of rotation; and determine the adjusted likelihood of a recoater event at each of the one or more layers of the part based on the predicted distortion amount and the determined severity factor for each of the plurality of angles of rotation.

The apparatus of any preceding clause, wherein the instructions further cause the apparatus to generate an image indicate the adjusted likelihood of a recoater event at each of the one or more layers of the part for each of the plurality of angles of rotation.

The apparatus of any preceding clause, wherein the instructions further cause the apparatus to determine an optimum angle of rotation from among the plurality of angles of rotation having a lowest likelihood of a recoater event at each of the one or more layers.

A system comprising an apparatus for performing additive manufacturing using a recoater; and a recoater event prediction apparatus configured to receive data associated with a part to be built by the apparatus for performing additive manufacturing; predict a distortion amount comprising a distance that the part is expected to distort in a vertical direction at one or more layers while the part is being built based on a simulation of the part being built; determine a likelihood of a recoater event based on the predicted distortion amount; determine a severity factor associated with the predicted distortion amount at each of the one or more layers of the part based on an orientation of the part at each of the one or more layers; and determine an adjusted likelihood of a recoater event at each of the one or more layers of the part based on the predicted distortion amount and the determined severity factor.

The system of any preceding clause, wherein the recoater event prediction apparatus is further configured to predict the distortion amount at a plurality of points at each of the one or more layers of the part; determine the likelihood of a recoater event at each of the one or more layers of the part; determine the severity factor associated with each of the plurality of points at each of the one or more layers of the part; and determine the adjusted likelihood of a recoater event at each of the plurality of points at each of the one or more layers of the part based on the predicted distortion amount at each of the plurality of points and the determined severity factor at each of the plurality of points.

The system of any preceding clause, wherein the recoater event prediction apparatus is further configured to generate an image indicating the adjusted likelihood of a recoater event at each of the plurality of points at each layer of the part.

The system of any preceding clause, wherein the recoater event prediction apparatus is further configured to determine an in-plane angle between the recoater and the part; determine an out-of-plane angle between the recoater and the part; and determine the severity factor based on the determined in-plane angle and the determined out-of-plane angle.

The system of any preceding clause, wherein the recoater event prediction apparatus is further configured to: determine an in-plane severity factor based on determined the in-plane angle and an in-plane sensitivity schedule; determine an out-of-plane severity factor based on the determined out-of-plane angle and an out-of-plane sensitivity schedule; and determine the severity factor based on the determined in-plane severity factor and the determined out-of-plane severity factor.

The system of any preceding clause, wherein the in-plane sensitivity schedule associates each in-plane angle between 0 and 180 degrees with an in-plane severity factor between 0 and 1; and the out-of-plane sensitivity schedule associates each out-of-plane angle between 0 and 180 degrees with an out-of-plane severity factor between 0 and 1.

The system of any preceding clause, wherein the recoater event prediction apparatus is further configured to determine the severity factor by multiplying the determined in-plane severity factor by the determined out-of-plane severity factor.

The system of any preceding clause, wherein the recoater event prediction apparatus is further configured to determine a severity factor associated with the predicted distortion amount at each of the one or more layers of the part for a plurality of angles of rotation of the part based on the orientation of the part at each of the one or more layers for each of the plurality of angles of rotation; and determine the adjusted likelihood of a recoater event at each of the one or more layers of the part based on the predicted distortion amount and the determined severity factor for each of the plurality of angles of rotation.

The system of any preceding clause, wherein the recoater event prediction apparatus is further configured to generate an image indicate the adjusted likelihood of a recoater event at each of the one or more layers of the part for each of the plurality of angles of rotation.

The system of any preceding clause, wherein the recoater event prediction apparatus is further configured to determine an optimum angle of rotation from among the plurality of angles of rotation having a lowest likelihood of a recoater event at each of the one or more layers.

What is claimed is:

1. A method comprising:
   receiving data associated with a part to be built by additive manufacturing using a recoater;
   predicting a distortion amount comprising a distance that the part is expected to distort in a vertical direction at one or more layers while the part is being built based on a simulation of the part being built;
   determining a likelihood of a recoater event based on the predicted distortion amount;
   determining a severity factor associated with the predicted distortion amount at each of the one or more layers of the part based on an orientation of the part at each of the one or more layers; and
   determining an adjusted likelihood of a recoater event at each of the one or more layers of the part based on the predicted distortion amount and the determined severity factor.

2. The method of claim 1, further comprising:
   predicting the distortion amount at a plurality of points at each of the one or more layers of the part;
   determining the likelihood of a recoater event at each of the plurality of points at each of the one or more layers of the part;
   determining the severity factor associated with each of the plurality of points at each of the one or more layers of the part; and
   determining the adjusted likelihood of a recoater event at each of the plurality of points at each of the one or more layers of the part based on the predicted distortion amount at each of the plurality of points and the determined severity factor at each of the plurality of points.

3. The method of claim 2, further comprising:
generating an image indicating the adjusted likelihood of a recoater event at each of the plurality of points at each layer of the part.

4. The method of claim 1, further comprising, for each of the one or more layers of the part:
determining an in-plane angle between the recoater and the part;
determining an out-of-plane angle between the recoater and the part; and
determining the severity factor based on the determined in-plane angle and the determined out-of-plane angle.

5. The method of claim 4, further comprising:
determining an in-plane severity factor based on the determined in-plane angle and an in-plane sensitivity schedule;
determining an out-of-plane severity factor based on the determined out-of-plane angle and an out-of-plane sensitivity schedule; and
determining the severity factor based on the determined in-plane severity factor and the determined out-of-plane severity factor.

6. The method of claim 5, wherein:
the in-plane sensitivity schedule associates each in-plane angle between 0 and 180 degrees with an in-plane severity factor between 0 and 1; and
the out-of-plane sensitivity schedule associates each out-of-plane angle between 0 and 180 degrees with an out-of-plane severity factor between 0 and 1.

7. The method of claim 6, further comprising:
determining the severity factor by multiplying the determined in-plane severity factor by the determined out-of-plane severity factor.

8. The method of claim 1, further comprising:
determining a severity factor associated with the predicted distortion amount at each of the one or more layers of the part for a plurality of angles of rotation of the part based on the orientation of the part at each of the one or more layers for each of the plurality of angles of rotation; and
determining the adjusted likelihood of a recoater event at each of the one or more layers of the part based on the predicted distortion amount and the determined severity factor for each of the plurality of angles of rotation.

9. The method of claim 8, further comprising:
generating an image indicate the adjusted likelihood of a recoater event at each of the one or more layers of the part for each of the plurality of angles of rotation.

10. The method of claim 8, further comprising:
determining an optimum angle of rotation from among the plurality of angles of rotation having a lowest adjusted likelihood of a recoater event at each of the one or more layers.

11. An apparatus comprising:
one or more processors;
one or more memory modules; and
machine-readable instructions stored in the one or more memory modules that, when executed by the one or more processors, cause the apparatus to:
receive data associated with a part to be built by additive manufacturing using a recoater;
predict a distortion amount comprising a distance that the part is expected to distort in a vertical direction at one or more layers while the part is being built based on a simulation of the part being built;
determine a likelihood of a recoater event based on the predicted distortion amount;
determine a severity factor associated with the predicted distortion amount at each of the one or more layers of the part based on an orientation of the part at each of the one or more layers; and
determine an adjusted likelihood of a recoater event at each of the one or more layers of the part based on the predicted distortion amount and the determined severity factor.

12. The apparatus of claim 11, wherein the instructions further cause the apparatus to:
predict the distortion amount at a plurality of points at each of the one or more layers of the part;
determine the likelihood of a recoater event at each of the one or more layers of the part;
determine the severity factor associated with each of the plurality of points at each of the one or more layers of the part; and
determine the adjusted likelihood of a recoater event at each of the plurality of points at each of the one or more layers of the part based on the predicted distortion amount at each of the plurality of points and the determined severity factor at each of the plurality of points.

13. The apparatus of claim 11, wherein the instructions further cause the apparatus to:
determine an in-plane angle between the recoater and the part;
determine an out-of-plane angle between the recoater and the part; and
determine the severity factor based on the determined in-plane angle and the determined out-of-plane angle.

14. The apparatus of claim 13, wherein the instructions further cause the apparatus to:
determine an in-plane severity factor based on the determined in-plane angle and an in-plane sensitivity schedule;
determine an out-of-plane severity factor based on the determined out-of-plane angle and an out-of-plane sensitivity schedule; and
determine the severity factor based on the determined in-plane severity factor and the determined out-of-plane severity factor.

15. The apparatus of claim 11, wherein the instructions further cause the apparatus to:
determine a severity factor associated with the predicted distortion amount at each of the one or more layers of the part for a plurality of angles of rotation of the part based on the orientation of the part at each of the one or more layers for each of the plurality of angles of rotation; and
determine the adjusted likelihood of a recoater event at each of the one or more layers of the part based on the predicted distortion amount and the determined severity factor for each of the plurality of angles of rotation.

16. A system comprising:
an apparatus for performing additive manufacturing using a recoater; and
a recoater event prediction apparatus configured to:
receive data associated with a part to be built by the apparatus for performing additive manufacturing;
predict a distortion amount comprising a distance that the part is expected to distort in a vertical direction at one or more layers while the part is being built based on a simulation of the part being built;

determine a likelihood of a recoater event based on the predicted distortion amount;

determine a severity factor associated with the predicted distortion amount at each of the one or more layers of the part based on an orientation of the part at each of the one or more layers; and determine an adjusted likelihood of a recoater event at each of the one or more layers of the part based on the predicted distortion amount and the determined severity factor.

17. The system of claim 16, wherein the recoater event prediction apparatus is further configured to:
predict the distortion amount at a plurality of points at each of the one or more layers of the part;
determine the likelihood of a recoater event at each of the one or more layers of the part;
determine the severity factor associated with each of the plurality of points at each of the one or more layers of the part; and
determine the adjusted likelihood of a recoater event at each of the plurality of points at each of the one or more layers of the part based on the predicted distortion amount at each of the plurality of points and the determined severity factor at each of the plurality of points.

18. The apparatus of claim 16, wherein the recoater event prediction apparatus is further configured to:
determine an in-plane angle between the recoater and the part;
determine an out-of-plane angle between the recoater and the part; and
determine the severity factor based on the determined in-plane angle and the determined out-of-plane angle.

19. The system of claim 18, wherein the recoater event prediction apparatus is further configured to:
determine an in-plane severity factor based on the in-plane angle and an in-plane sensitivity schedule;
determine an out-of-plane severity factor based on the out-of-plane angle and an out-of-plane sensitivity schedule; and
determine the severity factor based on the determined in-plane severity factor and the determined out-of-plane severity factor.

20. The system of claim 16, wherein the recoater event prediction apparatus is further configured to:
determine a severity factor associated with the predicted distortion amount at each of the one or more layers of the part for a plurality of angles of rotation of the part based on the orientation of the part at each of the one or more layers for each of the plurality of angles of rotation; and
determine the adjusted likelihood of a recoater event at each of the one or more layers of the part based on the predicted distortion amount and the determined severity factor for each of the plurality of angles of rotation.

* * * * *